United States Patent [19]

Bousseau

[11] Patent Number: 5,275,258
[45] Date of Patent: Jan. 4, 1994

[54] APPARATUS FOR DETECTING BEARING-SEIZING CONDITIONS IN A RECIPROCATING MACHINE

[75] Inventor: Pierre Bousseau, Vanves, France

[73] Assignee: S.E.M.T. Pielstick, Saint-Denis, France

[21] Appl. No.: 975,889

[22] Filed: Nov. 13, 1992

[30] Foreign Application Priority Data

Nov. 14, 1991 [FR] France ............... 91 14006

[51] Int. Cl.⁵ ............................. F01M 1/18
[52] U.S. Cl. .................. 184/6.4; 184/6.5; 184/108; 123/196 S; 73/53.05; 73/118.1
[58] Field of Search ............ 184/6.4, 6.5, 108; 123/196; 73/53.05, 118.1

[56] References Cited

U.S. PATENT DOCUMENTS

| | | |
|---|---|---|
| 4,095,552 | 6/1978 | Lo . |
| 4,796,204 | 1/1989 | Inoue ............... 123/196 S |
| 4,913,108 | 4/1990 | Sougawa et al. ............ 123/196 S |

FOREIGN PATENT DOCUMENTS

| | | |
|---|---|---|
| 01199069 | 10/1986 | European Pat. Off. . |
| 0418161 | 3/1991 | European Pat. Off. . |
| 380876 | 9/1923 | Fed. Rep. of Germany ...... 184/108 |
| 1122784 | 1/1962 | Fed. Rep. of Germany ....... 184/6.4 |
| 2806875 | 8/1978 | Fed. Rep. of Germany ..... 73/53.05 |
| 3412728 | 10/1985 | Fed. Rep. of Germany ....... 184/6.4 |
| 0085413 | 5/1984 | Japan ................ 184/108 |
| 223841 | 1/1943 | Switzerland . |

*Primary Examiner*—Thomas E. Denion
*Attorney, Agent, or Firm*—Sughrue, Mion, Zinn, Macpeak & Seas

[57] ABSTRACT

Apparatus for detecting degradation of the lubrication conditions of smooth bearings connecting a crank shaft to a connecting rod or connecting the crank shaft to the body of a machine that reciprocates in operation, lubrication being provided by oil circulation, the apparatus including means for detecting the phenomenon of seizure, wherein the apparatus comprises an additional bearing serving as a test bearing, said test bearing being lubricated by circulation of the same oil as is used for the other bearings and supporting a radially-loaded rotating shaft, said detection means being fitted to the test bearing which also includes means enabling it to be more sensitive than the other bearings to degraded lubrication conditions.

8 Claims, 2 Drawing Sheets

5,275,258

APPARATUS FOR DETECTING BEARING-SEIZING CONDITIONS IN A RECIPROCATING MACHINE

The invention relates to apparatus for detecting degradation in the lubrication conditions of bearings in a reciprocating machine. It relates in particular to detecting degradation in the lubrication conditions of the smooth bearings that connect a crank shaft to a connecting rod or that connect a crank shaft to the body of an internal combustion engine.

BACKGROUND OF THE INVENTION

The smooth bearings of an internal combustion engine are lubricated by oil under conditions of pressure, of temperature, of grain size of possible impurities, and of water content on admission to the engine that are all monitored in operation.

Untimely deterioration in one or more of these parameters can cause the film of oil that normally separates the bearing from its bush to disappear. The resulting metal-on-metal contact at the conditions of relative speed and of unit pressure existing in the engine then gives rise to the metal of the bearing and of the bush becoming welded together locally and this gives rise to permanent damage of the bearing called "seizing" after some variable length of time that depends on the extent to which the oil film is reduced.

Various apparatuses are already known for warning the driver of the engine that seizing phenomena are beginning. The bush or its immediate environment may be fitted with a temperature sensor, but this can be difficult for a big-end bearing. A sudden and rapid rise in the temperature of the bush represents abnormal heating of the parts in frictional contact, and a priori the cause of such a temperature rise will be seizing.

The drawback of such apparatuses for monitoring the bearings in an internal combustion engine lies in the fact that they are not preventative since seizing must have begun before it can be detected. They are intended merely for reducing the amount of damage that occurs by enabling the driver of the engine to respond quickly.

According to the present invention, proposals are made to remedy this problem by means of a device that provides genuinely preventative detection of seizure conditions in the bearings of a reciprocating machine, and in particular the bearings of an internal combustion engine.

SUMMARY OF THE INVENTION

The invention thus provides apparatus for detecting degradation in the lubrication conditions of smooth bearings connecting a crank shaft to a connecting rod or connecting the crank shaft to the body of a machine that reciprocates in operation, lubrication being provided by oil circulation, the apparatus including means for detecting the phenomenon of seizure, wherein the apparatus comprises an additional bearing serving as a test bearing, said test bearing being lubricated by circulation of the same oil as is used for the other bearings and supporting a radially-loaded rotating shaft, said detection means being fitted to the test bearing which also includes means enabling it to be more sensitive than the other bearings to degraded lubrication conditions.

Preferably said means enabling the test bearing to be more sensitive are such that the relative tangential speed between the surface of said rotary shaft and the surface of said test bearing is greater than or equal to the speed which exists in each of the bearings to be monitored, the relative clearance between said shaft and the reference bearing is greater than or equal to the relative clearance existing in each of the bearings to be monitored, and the design oil pressure of the shaft on the test bearing is less than or equal to the corresponding pressure in each of the bearings to be monitored.

The test bearing and its rotary shaft may be situated in the same machine enclosure as the bearings to be monitored, the shaft of the test bearing being driven by the reciprocating machine.

The test bearing and its rotary shaft may be situated outside the machine enclosure containing the bearings to be monitored, the shaft of the test bearing being driven by a machine which is distinct from the reciprocating machine.

The radial load applied to the test bearing may be constant in direction, in sense, and in intensity, regardless of the load on the reciprocating machine.

The radial load applied to the test bearing varies and may also vary as a direct function of the load on the reciprocating machine.

It is advantageous for the signal delivered by the detection means to be compared with a reference value so as to trigger an alarm signal when the signal delivered by the detection means reaches the reference value.

The detection means may comprise a temperature sensor.

DETAILED DESCRIPTION

Figure 2:
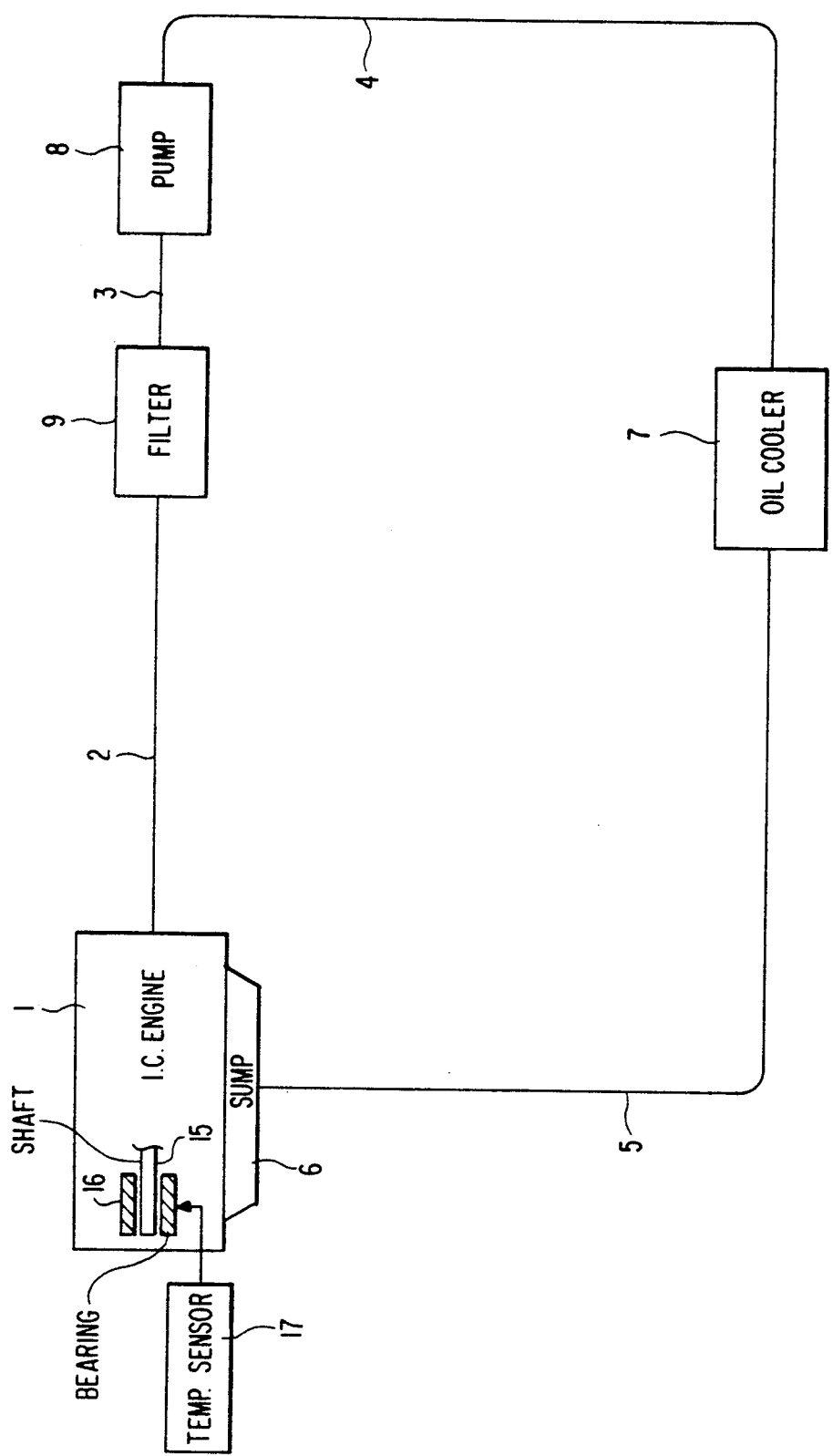

FIG. 2 is a schematic block diagram of a second embodiment of the invention wherein the test bearing and its rotary shaft are situated in the same machine enclosure as the bearings to be monitored.

The accompanying figures shows the case where the reciprocating machine is an internal combustion engine, with the test bearing and its rotary shaft being situated outside the enclosure of the engine that contains the bearings to be monitored.

The smooth bearings of the internal combustion engine 1 are lubricated by a flow oil, the oil being processed outside the engine. Ducts 2, 3, 4, and 5 serve to circulate the oil outside the engine. The oil is extracted from the sump 6 of the engine, passes through a cooler 7, then via a pump 8 into a filter 9 to be reinjected into the smooth bearings of the engine 1. This constitutes the normal lubrication circuit for the smooth bearings of an internal combustion engine.

A branch circuit comprising ducts 10 and 11 is provided on the above normal lubrication circuit. This branch circuit is connected between the oil inlet to the engine 1 and its oil outlet. When necessary, it may be isolated from the normal circuit by means of valves 12 and 13.

An auxiliary engine 14 drives a shaft 15 which is supported by the test bearing 16. The test bearing is lubricated by the oil flowing through the branch circuit and as processed by the normal lubrication circuit.

Since the test bearing is more sensitive than the other bearings to degraded lubrication conditions, it will provide preventative warning of the arrival of conditions in which the bearing of the engine may seize.

In conventional manner, the test bearing may be fitted with a system for detecting the phenomenon of seizing, e.g. comprising a temperature sensor 17 that delivers a signal which is compared with a reference value to trigger an alarm signal whenever the signal delivered by the sensor reaches the reference value.

Figure 1:
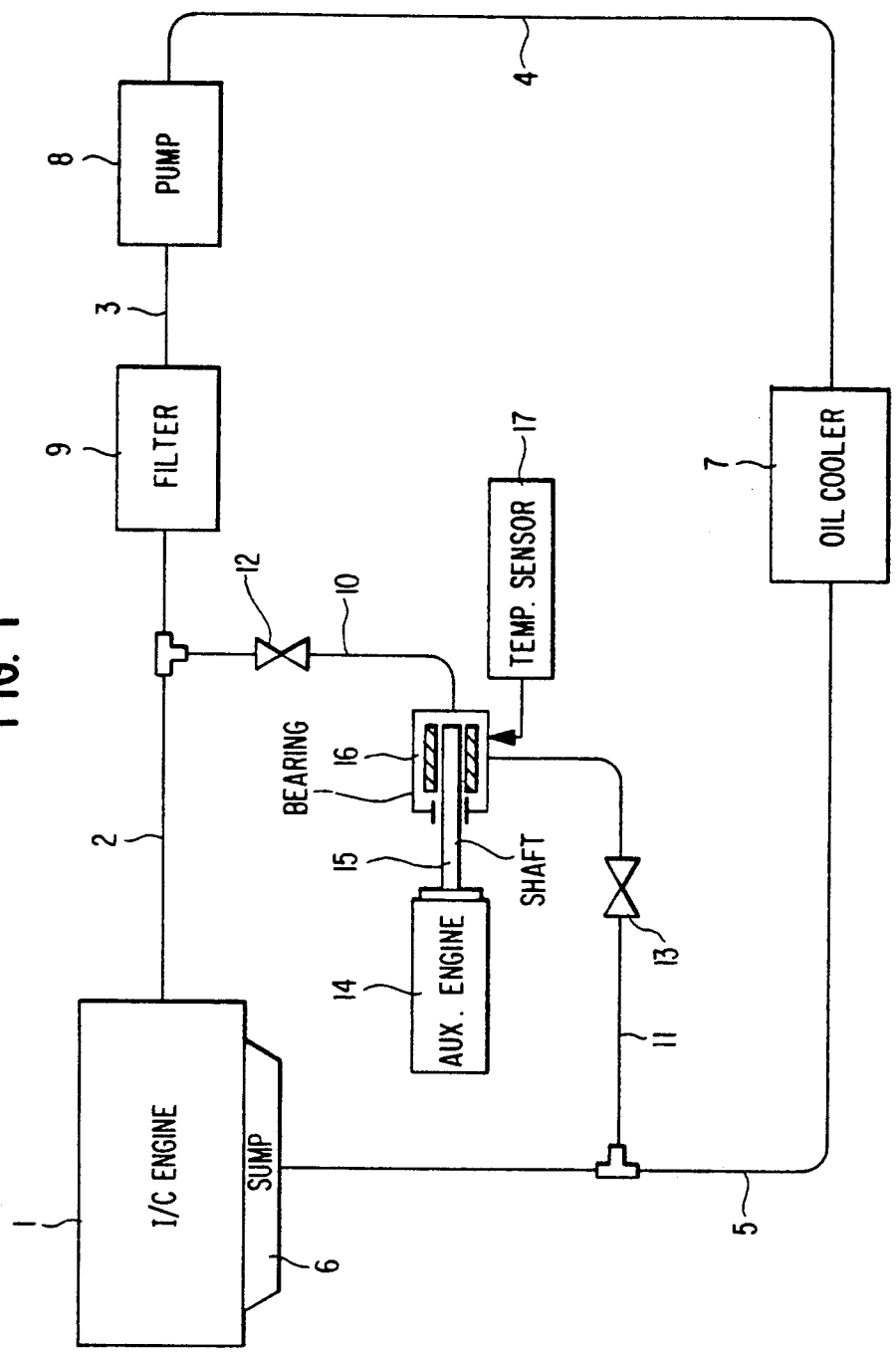
FIG. 1 is a schematic view of a first embodiment of the invention which is a block diagram of an internal combustion engine fitted with the detection apparatus of the invention.

FIG. 2 shows a second embodiment using the same numerals as in FIG. 1 for like elements, and in which the test bearing 16 is situated in the same machine enclosure, that is the I.C. engine 1, as the bearings to be monitored, and the test bearing 16 is fitted with a temperature sensor 17.

I claim:

1. Apparatus for detecting degradation of lubrication conditions of smooth bearings connecting a crank shaft to a connecting rod or connecting the crank shaft to a body of a reciprocating machine, lubrication being provided by oil circulation, the apparatus including means for detecting a phenomenon of seizure, wherein the apparatus comprises an additional bearing serving as a test bearing, said test bearing being lubricated by circulation of the same oil as is used for the other bearings and supporting a radially-loaded rotating shaft, said detection means being fitted to the test bearing which also includes means enabling said test bearing to be more sensitive than the other bearings to degraded lubrication conditions.

2. Apparatus according to claim 1, wherein said means enabling the test bearing to be more sensitive are such that a relative tangential speed between a surface of said rotary shaft and a surface of said test bearing is greater than or equal to a speed existing in each of the bearings to be monitored, wherein a relative clearance between said shaft and the reference bearing is greater than or equal to a relative clearance existing in each of the bearings to be monitored, and wherein a design oil pressure of the shaft on the test bearing is less than or equal to a corresponding pressure in each of the bearings to be monitored.

3. Apparatus according to claim 1, wherein the test bearing and said rotary shaft are situated in a same machine enclosure as the bearings to be monitored, the shaft of the test bearing being driven by the reciprocating machine.

4. Apparatus according to claim 1, wherein the test bearing and said rotary shaft are situated outside an enclosure of the machine containing the bearings to be monitored, the shaft of the test bearing being driven by a machine which is distinct from the reciprocating machine.

5. Apparatus according to claim 1, wherein the radial load applied to the test bearing is constant in direction, in sense, and in intensity, regardless of a load on the reciprocating machine.

6. Apparatus according to claim 1, wherein the radial load applied to the test bearing varies and is a direct function of a load on the reciprocating machine.

7. Apparatus according to claim 1, wherein the detection means deliver a signal which is compared with a reference value to trigger an alarm signal when the signal delivered by the detection means reaches the reference value.

8. Apparatus according to claim 1, wherein said detection means comprise a temperature sensor.

* * * * *